(12) United States Patent
Schott et al.

(10) Patent No.: US 11,444,697 B2
(45) Date of Patent: Sep. 13, 2022

(54) METHOD FOR COMMUNICATION BETWEEN TWO UTILITY VEHICLES

(71) Applicant: DEERE & COMPANY, Moline, IL (US)

(72) Inventors: Florian Schott, Einhausen (DE); Norbert Fritz, Ilvesheim (DE); Juergen Hollstein, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/155,722

(22) Filed: Jan. 22, 2021

(65) Prior Publication Data

US 2021/0273726 A1    Sep. 2, 2021

(30) Foreign Application Priority Data

Feb. 28, 2020   (DE) .......................... 102020202584.3

(51) Int. Cl.
*H04B 10/00* (2013.01)
*H04B 10/43* (2013.01)
*H04W 4/46* (2018.01)

(52) U.S. Cl.
CPC .............. *H04B 10/43* (2013.01); *H04W 4/46* (2018.02)

(58) Field of Classification Search
CPC ... H04B 10/11; H04B 10/112; H04B 10/1123; H04B 10/1127; H04B 10/1129; H04B 10/40; H04B 10/1143; H04B 10/1149; H04B 10/116; H04B 10/43; H04W 4/46; H04W 4/44

USPC ....... 398/172, 118, 119, 127, 128, 129, 130, 398/131, 135, 136, 33, 158, 159
See application file for complete search history.

(56) References Cited

U.S. PATENT DOCUMENTS

| | | | |
|---|---|---|---|
| 10,195,980 B2 | 2/2019 | Widdowson et al. | |
| 10,538,195 B2 | 1/2020 | Fritz et al. | |
| 10,958,356 B2* | 3/2021 | De-Lamberterie | .... H04B 10/70 |
| 2017/0186327 A1 | 6/2017 | Uysal et al. | |
| 2018/0196139 A1* | 7/2018 | Brown | .................... G01S 17/10 |

(Continued)

FOREIGN PATENT DOCUMENTS

| | | |
|---|---|---|
| CN | 108923856 A | 11/2018 |
| DE | 19839881 A1 | 3/2000 |

(Continued)

OTHER PUBLICATIONS

European Search Report issued in European Patent Application No. 21152520.9, dated Jul. 13, 2021, 16 pages.

(Continued)

*Primary Examiner* — Hanh Phan
(74) *Attorney, Agent, or Firm* — Taft Stettinius & Hollister LLP; Stephen F. Rost

(57) ABSTRACT

A method of communicating information via optical data transmission between two utility vehicles includes providing a control unit on a first utility vehicle, a work light on the first utility vehicle, and a second utility vehicle. The method also includes generating activation signals by the control unit of the first utility vehicle in dependence on transmission data to be transmitted, activating the work light by the activation signals, and emitting light signals via the activated work light to the second utility vehicle. The light signals represent the transmission data.

17 Claims, 1 Drawing Sheet

(56) References Cited

U.S. PATENT DOCUMENTS

2018/0279539 A1 10/2018 Wagner
2019/0052359 A1 2/2019 Brady et al.

FOREIGN PATENT DOCUMENTS

DE 102015104928 A1 10/2016
EP 3363684 A1 8/2018

OTHER PUBLICATIONS

Wikipedia, Visible Light Communications, accessed on Aug. 10, 2021, 3 pages.

* cited by examiner

METHOD FOR COMMUNICATION BETWEEN TWO UTILITY VEHICLES

RELATED APPLICATIONS

This application claims priority to German Application No. 102020202584.3, filed Feb. 28, 2020, the disclosure of which is hereby expressly incorporated by reference in its entirety.

FIELD OF THE DISCLOSURE

The present disclosure relates to a method for communication between two utility vehicles.

BACKGROUND

Due to narrower and narrower working windows, field work and harvesting work in agriculture are carried out simultaneously using multiple utility vehicles and increasingly partially shifted into the night. This is accompanied by an increasingly required coordination between the utility vehicles during their joint work assignment.

There is a need to make a common work assignment using multiple utility vehicles as efficient as possible.

SUMMARY

According to the present disclosure, a method for communication between two utility vehicles uses an optical data transmission. Light signals are used for a wireless communication technology. For this purpose, a control unit of a first utility vehicle generates activation signals in dependence on the data to be transmitted. By the activation signals, the control unit activates a work light (for example, headlight) of the first utility vehicle. The activated work light emits light signals which represent the transmission data.

By these emitted light signals, the first utility vehicle can transmit items of information or data relevant for the work assignment (for example, position data or other data of the first utility vehicle) automatically to further utility vehicles of this work assignment. Other utility vehicles of the common work assignment can thus be automatically informed about current states of the "transmitting" utility vehicle. In this way, a "receiving" utility vehicle can adapt a technical function relevant for the common work assignment, preferably also automatically. This assists the structured coordination and efficiency and an undisturbed sequence of the common work assignment. The common work assignment can therefore be made particularly cost-effective.

The optical communication enables, for example, an undesired mutual dazzling of multiple utility vehicles or mutual dazzling of their drivers during the common work assignment (for example, field work and harvesting work at night) to be avoided reliably. For this purpose, the light power of its own work light is automatically reduced by a "receiving" utility vehicle, for example, in dependence on the received transmission data.

The work light(s) provided in any case on the utility vehicle is/are used not only for illuminating the working field but rather also for data transmission in the method in a multiple function. In this way, the method can be carried out particularly inexpensively without additional optical emitting elements.

The emitted optical data are in particular generated light frequencies which can be visible or invisible to the human eye.

In the method, all utility vehicles of the common work assignment are also active as "transmitters" and as "receivers" of transmission data. In this way, a type of data network results using current items of information between the participating utility vehicles, whereby the utility vehicles can automatically react technically to assist the common work assignment with respect to efficiency and cost-effectiveness.

Transmission data are continuously transmitted during the entire work assignment from at least one first utility vehicle, in particular all participating utility vehicles. In this way, other participating utility vehicles can be continuously informed about the current position or a current technical status of the "transmitting" utility vehicle.

In one embodiment, the first utility vehicle also has, in addition to its transmitter function, at least one optical receiving unit to be able to receive light signals or optical transmission data from a further utility vehicle. In this way, a bidirectional optical communication results between each two utility vehicles which are located in the common work assignment. The optical receiving unit contains one or more photodetector(s). Alternatively, the optical receiving unit can also be a camera system.

The light signals transmitted by the second utility vehicle are converted in a technically suitable manner in the first utility vehicle into a defined data format, i.e., into transmission data. This is performed, for example, by a suitable converter function in the control unit of the first utility vehicle.

The light signals or transmission data (for example, current position of the second utility vehicle) transmitted by the second utility vehicle can be used in the first utility vehicle to activate its work light(s) to change the light intensity thereof. In this way, dazzling of the second utility vehicle or its driver by headlights of the first utility vehicle can be automatically avoided.

The transmission data emitted by a utility vehicle represent a specific status of this utility vehicle which is relevant as information for at least one further utility vehicle during the common work assignment. This is, for example, a current geographic position or a current technical feature of the "transmitting" utility vehicle. The coordination and efficiency of the common work assignment can be further improved using such automatically emitted items of information.

The geographic position as transmission data are based, for example, on a position acquisition system such as GPS, whereby the respective utility vehicle can provide its position data in a technically simple manner.

The method is carried out by a suitable arrangement. This arrangement for communication between two utility vehicles by optical data transmission has at least one control unit and at least one work light. The control unit is used to generate activation signals in dependence on the data to be transmitted. The work light activatable by the above-mentioned activation signals emits light signals which represent the transmission data.

To carry out the method, at least some, in particular all utility vehicles participating in the common work assignment are each equipped with the above-mentioned arrangement.

The work light may contain one or more LEDs. The optical communication or data transmission may be carried out in a particularly technically reliable manner by the use of LEDs. The LEDs are combined with a VLC (visible light communication) technology to carry out the optical data transmission.

Individual work lights or headlights can be equipped with a correspondingly suitable number of LEDs (for example, high-performance LEDs) and arranged on the utility vehicle in such a way that the work lights or headlights having a high light output (for example, up to 2000 lumen) enable a 360° illumination of the working field.

The method can be used for different types of utility vehicles which carry out a work assignment jointly, for example, in agriculture or forestry, in the field of road construction, mining, or quarrying.

For the common work assignment, the utility vehicle is part of a vehicle fleet having at least two identical or functionally equivalent utility vehicles. The utility vehicle is designed, for example, as an agricultural utility vehicle, in particular a tractor, forestry machine, or construction machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
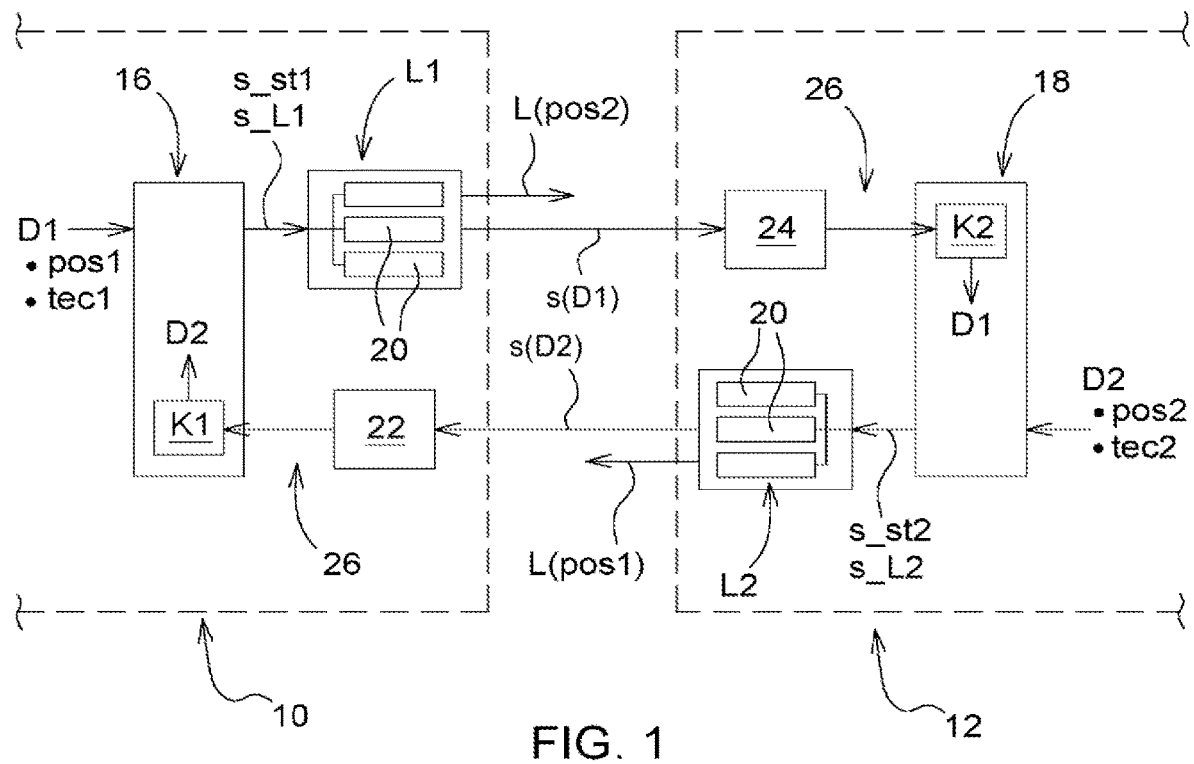
FIG. 1 shows a schematic block diagram illustration of two utility vehicles communicating with one another.

FIG. 1 schematically shows a first utility vehicle 10 and a second utility vehicle 12, which communicate with one another via optical data transmission. A control unit 16 of the first utility vehicle 10 receives various data D1, which are provided at utility vehicle 10, for example, via a CAN bus. A control unit 18 of the second utility vehicle 12 correspondingly receives various data D2, which are provided at the utility vehicle 12, for example, via a CAN bus.

The current position post or pos2 and a technical status tec1 or tec2 of the first utility vehicle 10 or the second utility vehicle 12 are to be transmitted as data by the data D1 or D2 to the respective other utility vehicle 12 or 10, respectively. For this purpose, the control unit 16 or 18 generates corresponding activation signals s_st1 or s_st2 in dependence on the data pos1 and tec1 or pos2 and tec2 to be transmitted. Using these activation signals, the control unit 16 or 18 activates a work light L1 or L2, respectively. More precisely, a plurality of LEDs—only three LEDs 20 are illustrated schematically and by way of example here—are activated. The work light L1 or L2 activated in this manner emits light signals s(D1) or s(D2), which represent the transmission data pos1 and tec1 or the transmission data pos2 and tec2.

In the above-described manner, more than one work light L1 or L2 of a utility vehicle can also be activated, so that a plurality of other utility vehicles participating in the common work assignment are informed simultaneously for example about the current position pos1 and the status tec1 of the first utility vehicle 10. If multiple differently arranged work lights L1 or L2 are used on the respective utility vehicle 10 or 12, the respective other utility vehicle 12 or 10 can also be reliably informed independently of its relative position with respect to the "transmitting" utility vehicle.

Furthermore, an optical receiving unit 22, such as in the form of a photodetector, is arranged on the first utility vehicle 10. It is used to receive light signals s(D2) of the second utility vehicle 12. These light signals s(D2) are converted into a defined data format in a signal converter K1. In this way, the control unit 16 can read transmission data D2 which are transmitted by the second utility vehicle 12. These data are, for example, the current position pos2 and at least one technical status feature tec2 of the second utility vehicle 12.

The signal converter K1 can alternatively also be arranged outside the control unit 16 as a physically separate unit.

According to the above-mentioned description, the transmission data D1 transmitted by the first utility vehicle 10 are received by an optical receiving unit 24 of the second utility vehicle 12 and converted in a signal converter K2 into a defined data format, so that the control unit 18 can read the transmission data D1.

The respective control unit 16 or 18 can evaluate the received transmission data D2 or D1, respectively, and initiate technical measures. One example of this is reducing (dimming) the light output or light intensity of the work light L1 or L2 to avoid dazzling of the respective other utility vehicle or its driver.

For example, the control unit 16 receives the current position pos2 of the second utility vehicle 12 and determines therefrom a light intensity L(pos2), which is perceived as non-dazzling for the second utility vehicle 12 or its driver. The control unit 16 activates the work light L1 using corresponding control signals s_L1, which generate the desired light intensity L(pos2).

Correspondingly, the control unit 18 can also react with control signals s_L2 to a current position pos1 of the first utility vehicle 10, so that the work light L2 generates a light intensity L(pos1) non-dazzling to the first utility vehicle 10.

Figure 2:
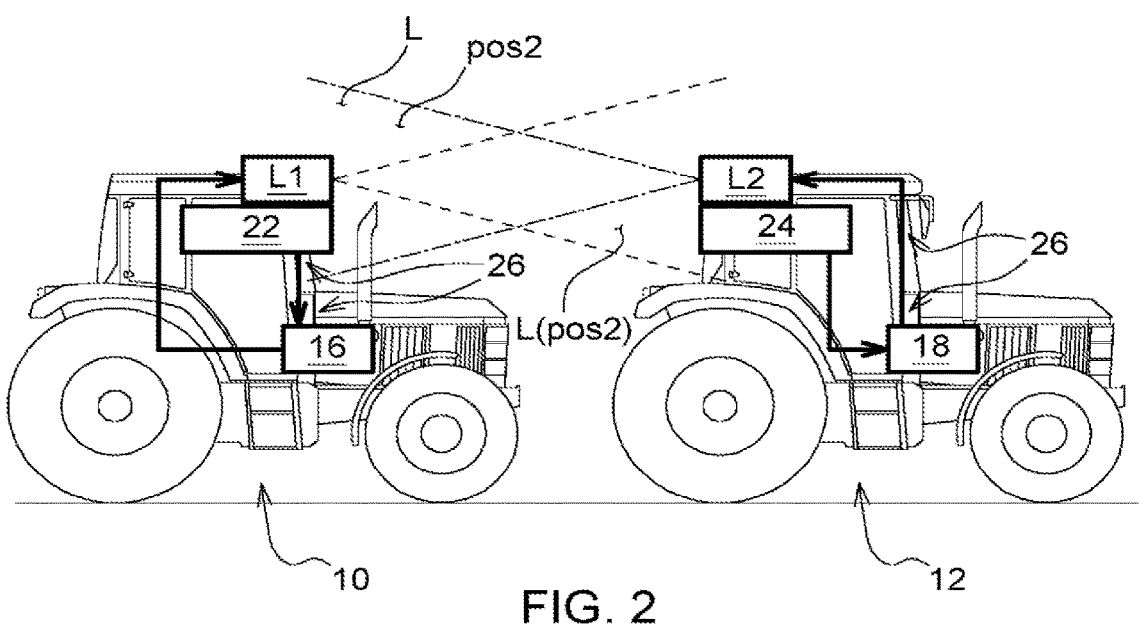
FIG. 2 shows two tractors having components of an arrangement for optical communication with one another.

In FIG. 2, the two utility vehicles 10, 12, each designed as a tractor, drive one behind the other. The second utility vehicle 12 emits via its work light L2, for example, a light intensity L and its current position pos2 to the optical receiving unit 22 of the first utility vehicle 10. Its control unit 16 then activates the work light L1 in such a way that the latter illuminates the region of the second utility vehicle 12 without dazzling using a possibly modified light intensity L(pos2).

As schematically shown in FIG. 2, the control unit 16 or 18 and the work light L1 or L2 are part of an arrangement 26, which is integrated into the utility vehicle 10 or 12, respectively. The arrangement 26 can be expanded in a technically reasonable manner, for example, by the receiving unit 22 or 24 or further technical components.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of communicating information via optical data transmission between two utility vehicles, comprising:
    providing a control unit on a first utility vehicle, a work light on the first utility vehicle, and a second utility vehicle;
    generating activation signals by the control unit of the first utility vehicle in dependence on transmission data to be transmitted, wherein the transmission data identifies a location and a technical status of the first utility vehicle which is provided at the first utility vehicle;
    activating the work light of the first utility vehicle by the activation signals to change its light intensity in dependence on transmission data transmitted by the second utility vehicle, wherein the transmission data emitted by the second utility vehicle is provided at the second utility vehicle and represents a location and a technical status of the second utility vehicle; and
    emitting light signals via the activated work light to the second utility vehicle, where the light signals represent the transmission data of the second utility vehicle.

2. The method of claim 1, wherein the first utility vehicle comprises an optical receive unit for receiving other light signals from a work light on the second utility vehicle.

3. The method of claim 2, wherein the optical receiving unit comprises a photodetector.

4. The method of claim 2, further comprising converting the other light signals from the second utility vehicle and received by the optical receiving unit into transmission data.

5. The method of claim 1, wherein transmission data emitted by the first utility vehicle represents a technical status or location of the first utility vehicle.

6. An arrangement for communication between a first and a second utility vehicle by optical data transmission, comprising:
    a control unit located on the first utility vehicle for generating activation signals in dependence on data to be transmitted, wherein the data to be transmitted is first utility vehicle transmission data that identifies a location and a technical status of the first utility vehicle received through a first utility vehicle CAN bus; and
    a work light located on the first vehicle activatable by the activation signals of the control unit to emit light signals representative of the first utility vehicle transmission data and in response to second utility vehicle transmission data that identifies a location and a technical status of the second utility vehicle.

7. The arrangement of claim 6, wherein the work light comprises at least one LED.

8. The arrangement of claim 6, wherein the second utility vehicle comprises an optical receive unit for receiving light signals transmitted by the work light located on the first utility vehicle.

9. The arrangement of claim 8, wherein the optical receiving unit comprises a photodetector.

10. The arrangement of claim 6, further comprising a signal converter for converting the light signals from the first utility vehicle into the first utility vehicle transmission data.

11. The arrangement of claim 6, further comprising:
    a second control unit located on the second utility vehicles for generating activation signals in dependence on data to be transmitted, wherein the data to be transmitted is the second utility vehicle transmission data received through a second utility vehicle CAN bus; and
    a second work light located on the second vehicle activatable by the activation signals of the second control unit to emit light signals representative of the second utility vehicle transmission data.

12. The arrangement of claim 11, wherein the second work light comprises at least one LED.

13. The arrangement of claim 11, wherein the first utility vehicle comprises an optical receive unit for receiving light signals from the second utility vehicle.

14. The arrangement of claim 13, wherein the optical receiving unit comprises a photodetector.

15. The arrangement of claim 11, further comprising a signal converter for converting the light signals from the second utility vehicle into second utility vehicle transmission data.

16. A utility vehicle, comprising:
    a control unit for generating activation signals in dependence on data to be transmitted via optical data transmission, wherein the data to be transmitted is utility vehicle transmission data received through the utility vehicle CAN bus; and
    a work light activatable by the activation signals of the control unit to emit light signals representative of the utility vehicle transmission data; and
    an optical receive unit for receiving light signals from another utility vehicle, wherein the received light signals are based on another utility vehicle transmission data received through the another utility vehicle CAN bus.

17. The utility vehicle of claim 16, wherein:
    the work light comprises at least one LED;
    the optical receive unit comprises a photodetector; and
    a signal converter for converting the light signals from the another utility vehicle into a light intensity of the work light based on a position of the another utility vehicle.

* * * * *